UNITED STATES PATENT OFFICE.

AUSTIN G. DAY, OF NEW YORK, N. Y.

IMPROVEMENT IN THE COMBINATION OF VEGETABLE OILS AND GRAHAMITE FOR THE MANUFACTURE OF VULCANIZED COMPOUNDS.

Specification forming part of Letters Patent No. 210,405, dated December 3, 1878; application filed March 8, 1877.

CASE F.

*To all whom it may concern:*

Be it known that I, AUSTIN G. DAY, of the State, county, and city of New York, have invented a new specific product of the general class of compounds formed by the combination of vegetable oils with a resinous body or bodies and sulphur, which are referred to in other Letters Patent of the United States issued to me, of even date herewith, Cases B and D; and I hereby declare that the following is a full, clear, and exact description of the same.

I have found that the material known as "grahamite" or "Ritchie mineral," which is a bituminous substance of a peculiar character, will, when combined with vegetable oils and sulphurized in the general manner set forth in the Letters Patent above mentioned, materially benefit the product and impart to it certain special qualities of much importance.

This invention therefore consists in producing a specific new compound of the class referred to by combining the special kind of bitumen called "grahamite," or its equivalent, with another resinous body and with vegetable oil and sulphur.

To make this new compound, I usually first take about twenty-six pounds of cotton-seed oil, about twenty-five pounds of liquid coal-tar, about ten pounds of grahamite, and preferably about one pound of the oxide of zinc. These ingredients I treat in substantially the same manner as is described in my other Letters Patent alluded to—that is to say, I first mix them together by themselves in a suitable vessel and heat them to about 330° Fahrenheit, or until they are thoroughly combined and brought into a homogeneous condition. I then allow the mixture to cool down to about 200° Fahrenheit, and when it is at this latter temperature I introduce into it about twenty-six pounds of linseed-oil, and then preferably raise the temperature, and when it reaches about 220° to 230° Fahrenheit I put in about fifteen pounds of sulphur, and continue increasing the heat until the entire mass becomes sulphurized. It may then be cooled, and when cool will be ready for use.

I have found beneficial results to attend the addition to the mixture, when it is at about the temperature of 240° Fahrenheit, of one and one-half ounce, or thereabout, of acid, (preferably sulphuric acid,) and, when it is at about 270° to 280°, of one to three ounces, or thereabout, of camphor. I therefore recommend that these substances be employed; but neither they nor the oxide of zinc mentioned above are essential.

I do not confine myself to the proportions and heats herein stated, as other relative quantities of the different ingredients and other temperatures may be used; but the mixture and mode of treatment here given will make a good product.

It will be found that this special compound possesses a better body and hardness than my other kerite products, and it is for this reason particularly well adapted to certain uses, such as covering for telegraph-wire, belting, shoes, &c. It may, however, be also employed for the same purposes as my other compounds.

Having thus made known my invention, what I claim, and desire to secure by Letters Patent, is—

The herein-described specific product formed by the combination of grahamite, or its equivalent, with another resinous body, and with vegetable oil and sulphur, substantially in the manner and for the purposes set forth.

AUSTIN G. DAY.

Witnesses:
  A. J. DE LACY,
  JOHN J. DIXON.